US007177982B2

United States Patent
Barrick

(10) Patent No.: US 7,177,982 B2
(45) Date of Patent: Feb. 13, 2007

(54) METHOD TO MAINTAIN ORDER BETWEEN MULTIPLE QUEUES WITH DIFFERENT ORDERING REQUIREMENTS IN A HIGH FREQUENCY SYSTEM

(75) Inventor: Brian Barrick, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 10/759,935

(22) Filed: Jan. 16, 2004

(65) Prior Publication Data
US 2005/0160203 A1    Jul. 21, 2005

(51) Int. Cl.
G06F 12/00    (2006.01)
G06F 9/30    (2006.01)
(52) U.S. Cl. .................. 711/125; 711/162; 711/156; 712/200
(58) Field of Classification Search ............... None
See application file for complete search history.

(56) References Cited

U.S. PATENT DOCUMENTS

| 5,898,854 | A | * | 4/1999 | Abramson et al. | 712/218 |
| 6,141,747 | A | * | 10/2000 | Witt | 712/225 |
| 6,289,437 | B1 | * | 9/2001 | Eisen et al. | 712/217 |
| 2001/0014941 | A1 | * | 8/2001 | Akkary et al. | 712/228 |
| 2003/0196075 | A1 | * | 10/2003 | Akkary et al. | 712/218 |
| 2004/0015740 | A1 | * | 1/2004 | Dautelle | 714/37 |

* cited by examiner

*Primary Examiner*—Matthew Kim
*Assistant Examiner*—Michael Krofcheck
(74) *Attorney, Agent, or Firm*—Stephen R. Tkacs; Stephen J. Walder, Jr.; Diana R. Gerhardt

(57) ABSTRACT

A method, an apparatus, and a computer program are provided for managing commands in a multi-queue system. Depending on the types of queues that are utilizes, there can be difficulties in managing the order of execution of commands. To alleviate this problem, dependencies and identifiers are associated with each command that allow command queues in the entire multi-queue system to monitor the status of all commands.

14 Claims, 4 Drawing Sheets

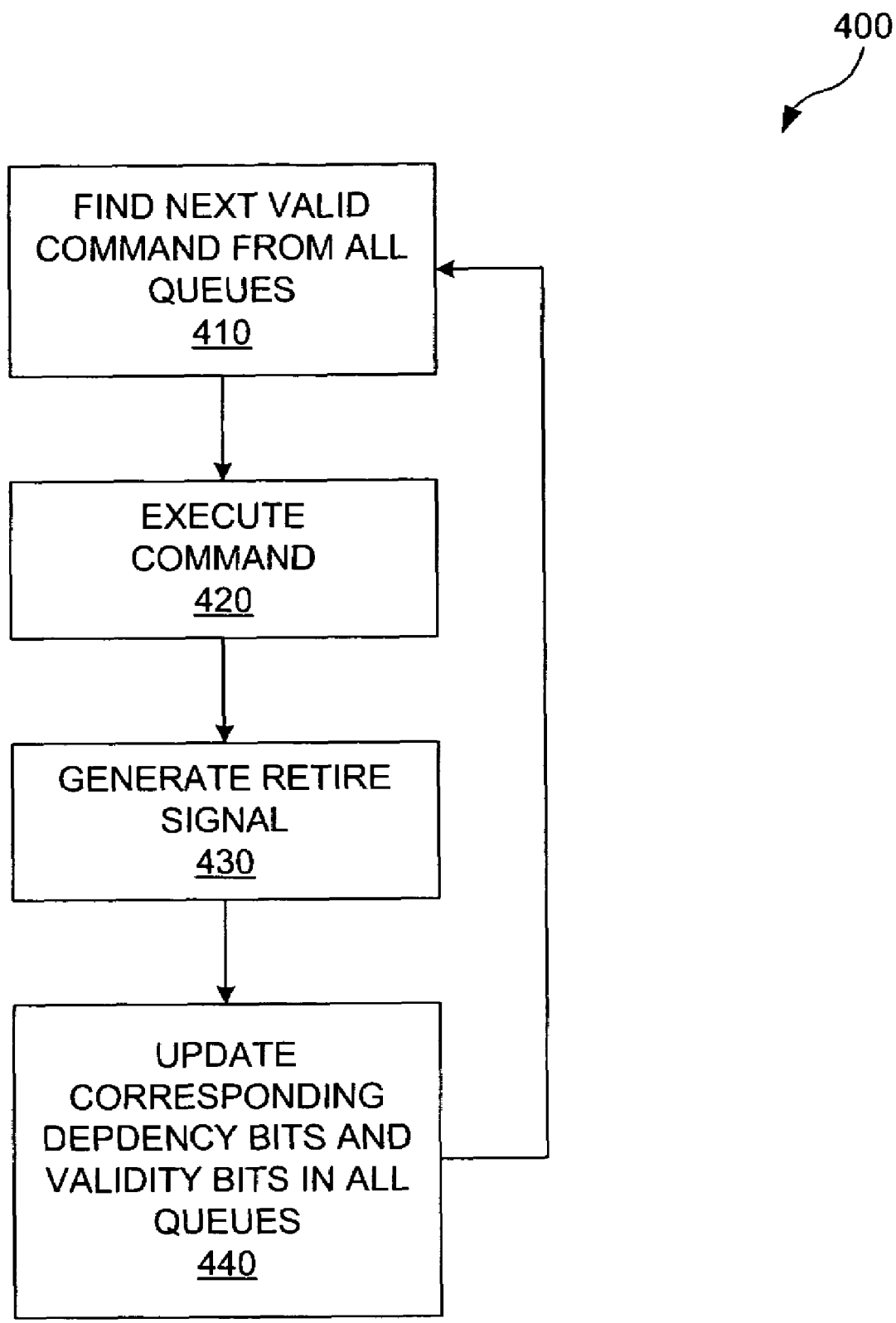

METHOD TO MAINTAIN ORDER BETWEEN MULTIPLE QUEUES WITH DIFFERENT ORDERING REQUIREMENTS IN A HIGH FREQUENCY SYSTEM

BACKGROUND OF THE INVENTION

1. Field of the Invention

The present invention relates generally to the operation of multiple command queues and, more particularly, to queue ordering and execution with multiple interdependent queues.

2. Description of the Related Art

Within a variety of computer architectures, there are a variety of devices that utilize command queues. A command queue is memory device that stores execution commands. For example, Direct Memory Access (DMA) devices are notorious for utilizing command queues.

Typically, commands are forwarded to some device, such as a DMA device, for execution. However, due to system constraints, such as available communication channels, all the commands cannot be instantaneously and simultaneously executed. Instead, the commands are forwarded to a pipeline of the device for execution. The device then stores the commands in a command queue and eventually executes the commands.

There are a variety of manners to execute the command, which can vary. Two common methods of addressing the order of execution are to use strict ordering or to use stack down ordering. With strict ordering, commands are executed strictly on the order upon which the commands enter the command queue. For example, a store queue for a DMA module would likely use strict ordering. With stack down ordering, commands can, not only, be executed in the order in which the commands enter the command queue, but also from the middle of the queue. Stack down ordering is often desirable in situations where there is interdependency between commands in a given command queue. For example, a read command for a DMA module would likely use a stack down order.

Moreover, in a device that has a command queue, there may not necessarily be a single command queue. For example, a DMA module can have separate queues for both storing and reading. A problem can arise with the order of execution, though, if there are two or more queues. There can be cases where there is cross-dependency between commands of different command queues. In other words, there can be a first commands in one queue that requires execution of a second command in a second queue before execution of the first command. For example, in DMA device, if command 8 in the storage queue requires execution of command 4 in the read queue before the execution of command 8, then there is interdependency between the storage and the read queue.

In most cases, though, each command queue is distinct. In other words, each queue tracks the commands and executes each command according to the requirements within the queue. However, there are some cases where interdependencies between multiple queues exist. Typically, there is not an efficient technique or apparatus to track the order of execution and interdependencies across multiple queues.

Therefore, there is a need for a method and/or apparatus for tracking commands across multiple command queues that addresses at least some of the problems associated with convention methods and apparatuses associated with the operation of multiple command queues.

SUMMARY OF THE INVENTION

The present invention provides a method for entering at least one command into a plurality of command queues. A command queue of the plurality of command queues at least corresponds to the at least one command is determined. The at least one command into the command queue that corresponds is entered. Upon entering the at least one command, a snapshot of the order of each of the plurality of command queues is taken. A valid bit is updated to indicate that a queue location is valid. A determination is made whether the command is dependent on any other commands to indicate if dependencies exist. If any dependencies exist, at least one dependency in a dependency bit is updated.

BRIEF DESCRIPTION OF THE DRAWINGS

For a more complete understanding of the present invention and the advantages thereof, reference is now made to the following descriptions taken in conjunction with the accompanying drawings, in which:

FIG. 4 is a flow chart of command execution of the multi-queue system.

DETAILED DESCRIPTION

In the following discussion, numerous specific details are set forth to provide a thorough understanding of the present invention. However, those skilled in the art will appreciate that the present invention can be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein can be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1A:
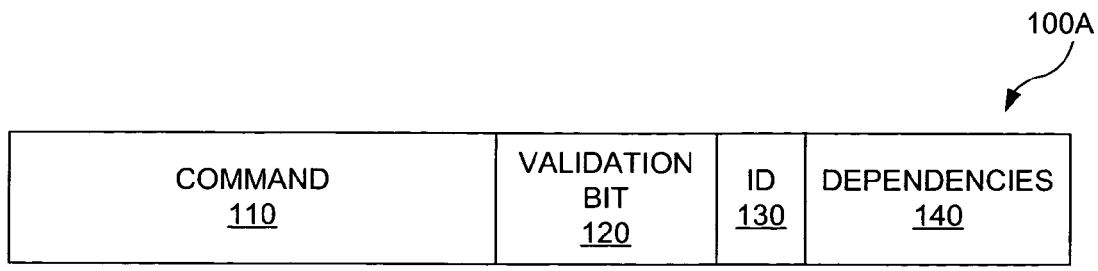
FIG. 1A is a block diagram depicting a stack down queue command.

Referring to FIG. 1A of the drawings, the reference numeral 100A generally designates a block diagram depicting a stack down queue command. The stack down queue command 100A comprises a command 110, a validation bit 120, and identification (ID) bit 130, and dependency bits 140.

There are a number of features that have been incorporated into the stack down queue command 100A that allow for efficiently operating and managing commands across varying queues in a multi-queue system. The command 110 is configured to be the instruction, which can be a variety of instructions that the multi-queue could utilize. For example, the command 110 can require that address XXXXX-XXX-XX be read. The validation bit 120 indicates that the command in the specified queue location is valid. In other words, the validation bit 120 identifies that the queue location contains a valid operation. The validation bit 120 can be used to determine if an older entry has become invalid allowing the stack down queue to move to the older command and can assist in identifying dependencies. The ID bit 130 is a reference bit. The ID bit 130 relates the moving queue entries to outside entries. More particularly, the ID bit 130 allows the strict order queue to track a command for monitoring any dependencies. The dependency bits 140 reference all of the bits that the command 110 is interdependent. In other words, the dependency bits 140 reference all other commands that are to be executed prior to the execution of the command 110. There are a variety of manners to order the referencing data.

Figure 1B:
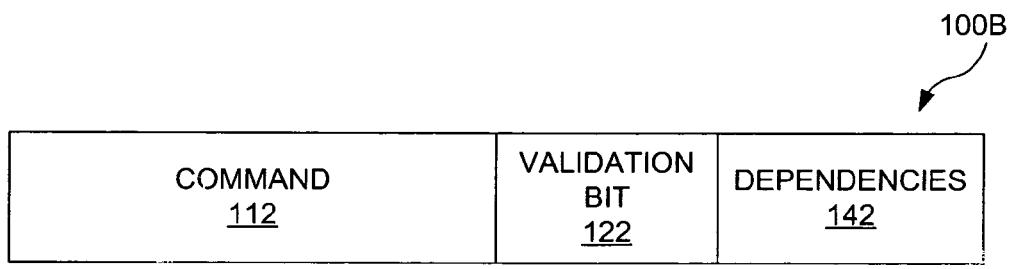
FIG. 1B is a block diagram depicting a strict queue command.

Referring to FIG. 1B of the drawings, the reference numeral 100B generally designates a block diagram depicting a strict order queue command. The strict order queue command 100B comprises a command 112, a validation bit 122, and dependency bits 142.

There are a number of features that have been incorporated into the strict order queue command 100B that allow for efficiently operating and managing commands across varying queues in a multi-queue system. The command 112 is configured to be the instruction, which can be a variety of instructions that the multi-queue could utilize. For example, the command 112 can require that address XXXXX-XXX-XX be read. The validation bit 122 indicates that the queue location is valid. In other words, the validation bit 122 identifies that the queue location contains a valid operation. The validation bit 122 typically can assist in identifying dependencies. However, the validation bit 122 in a strict order queue does not utilize the validation bit 122 to move to the oldest command since the strict order queue cannot execute out of order. The dependency bits 142 reference all of the bits that the command is interdependent. In other words, the dependencies bit 142 reference all other commands that are to be executed prior to the execution of the command 112. There are a variety of manners to order the referencing data.

Figure 2:
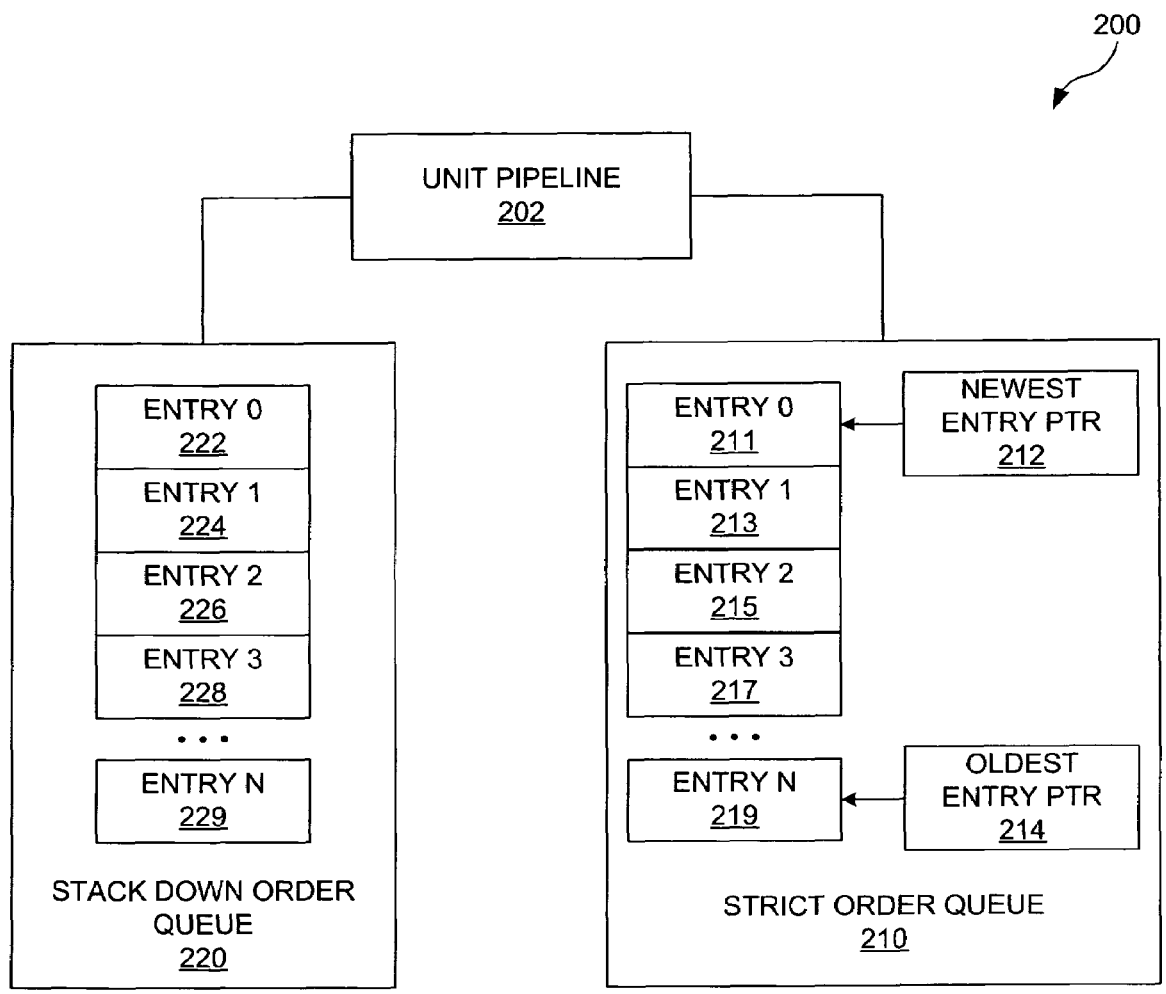
FIG. 2 is a block diagram depicting a multi-queue system.

Referring to FIG. 2 of the drawings, the reference numeral 200 generally designates a block diagram depicting a multi-queue system. The multi-queue system 200 comprises a unit pipeline 202, a stack down queue 220, and a strict order queue 210. Also, there can be a single or multiple queues, as depicted in FIG. 2. Moreover, the queue can be of a variety of types including, but not limited to, strict order queues and stack down order queues.

However, an illustration of the general components of the multi-queue system 200 does not lend itself to a complete explanation of the multi-queue system 200. The stack down order queue 220 further comprises a plurality of stack down command entries 222, 224, 226, 228, and 229. Each of the stack down command entries 222, 224, 226, 228, and 229 are a stack down queue command 100B of FIG. 1A because the stack down queue command 100A of FIG. 1B each have an ID bit 130 of FIG. 1A that allows for accounting of the command which further allows for the execution of command from the middle of the queue.

The strict order queue 210 operates differently from the stack down order queue 220. The strict order queue 210 further comprises a plurality of strict order command entries 211, 213, 215, 217, and 219, a newest entry pointer 212, and an oldest entry pointer 214. Because the strict order queue 210 does not allow for the execution of commands from the middle of the queue, there is no need for the use of an ID bit 130 of FIG. 1A associated with the stack down order command 100A. Instead, the strict order queue command associates the oldest entry pointer 214 with the oldest command, which is typically the next command in the strict order queue to be executed. The newest entry pointer 212 assists in maintaining an accounting of the overall order of the strict order queue 210 by indicating the next strict order queue location to occupy.

Figure 3:
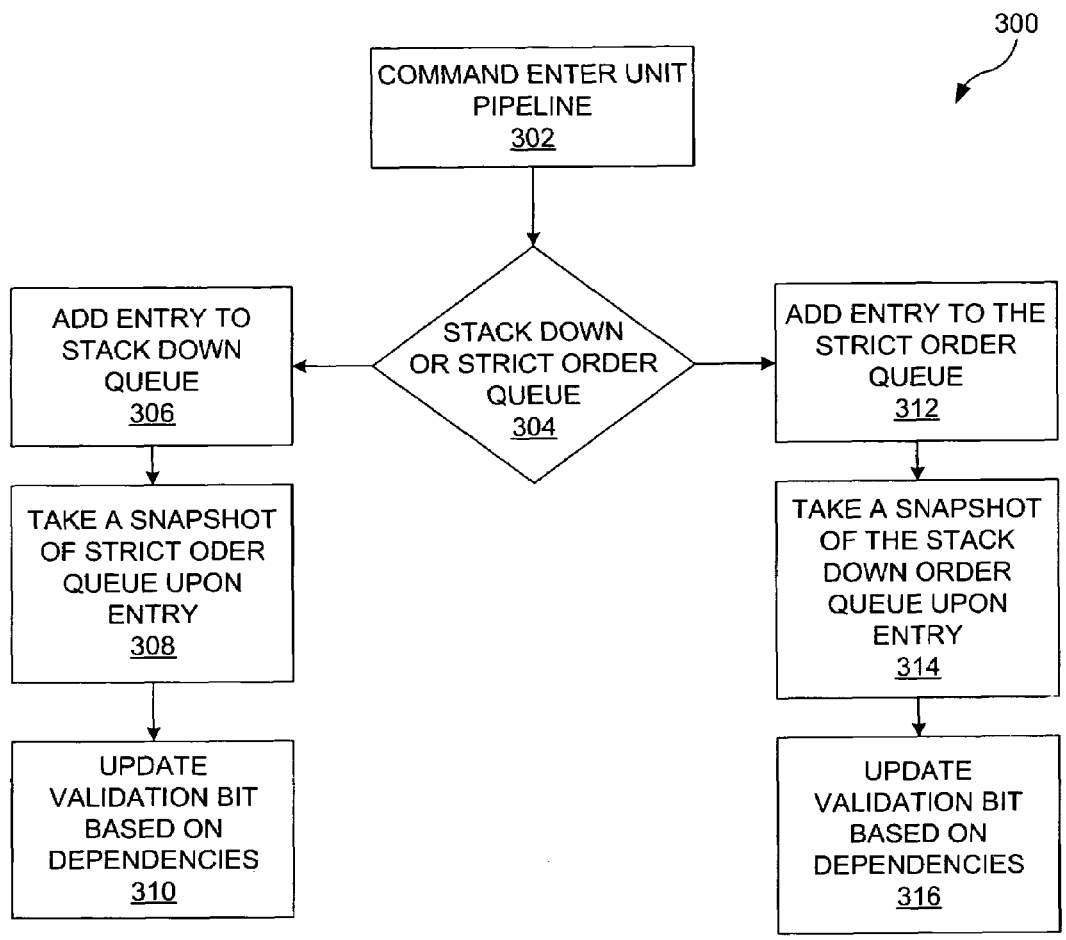
FIG. 3 is a flow chart of the entrance of a command into the multi-queue system.

Referring to FIG. 3 of the drawings, the reference numeral 300 generally designates a flow chart depicting the entrance of a command into the multi-queue system.

In steps 302, 304, 306, and 312, the command enters the unit pipeline and is directed to the correct, corresponding queue. Based on the nature of the command, the correct queue can be determined. There can be a single or multiple queues as shown in FIG. 3. FIG. 3 depicts only the usage of a stack down queue and of a strict order queue for the purposes of simplicity of illustration. However, there can be a single or multiple stack down queues, single or multiple strict order queues, or any combination thereof.

In step 308, if the command belongs in the stack down queue, then the command is entered into the queue and, upon entry, a snapshot of the opposing strict order queue is taken. The snapshot of the strict order queue preserves the order of the strict order queue. Preservation of the order of the strict order queue allows for the preservation of the correct order of execution of command from either queue taking into account inter- and cross-dependencies.

In step 310, once the snapshot of the order of the strict order queue, then the new command is updated. The various bits, such as the validation bit 120 of FIG. 1A and the dependency bit 140 of FIG. 1A, can be updated to reflect the status of the strict order queue and the status of commands internal to the stack down queue. Reflection of the order of the strict order queue allows for the proper execution of commands from taking into account inter- and cross-dependencies between the new command and existing commands in the strict order queue and stack down queue.

In step 314, if the command belongs in the strict order queue, then the command is entered into the queue and a snapshot of the opposing stack down queue is taken. The snapshot of the stack down queue preserves the order of the stack down queue. Preservation of the order of the stack down queue allows for the preservation of the correct order of execution of command from either queue taking into account inter- and cross-dependencies.

In step 316, once the snapshot of the order of the strict order queue, then the new command is updated. The various bits, such as the validation bit 120 of FIG. 1A and the dependency bit 140 of FIG. 1A, can be updated to reflect the status of the stack down queue and the status of commands internal to the strict order queue. Reflection of the order of the strict order queue allows for the proper execution of commands from taking into account inter- and cross-dependencies between the new command and existing commands in the strict order queue and stack down queue.

Referring to FIG. 4 of the drawings, the reference numeral 400 generally designates a flow chart depicting command execution of the multi-queue system.

In step 410 and 420, the next valid command is found and executed. Based on the problems of inter- and cross-dependencies, the command can be require to be executed in a certain order. With the introduction of validation 120 of FIG. 1A and 122 of FIG. 1B and dependency bits 140 of FIG. 1A and 142 of FIG. 1B, the device that utilizes the multiple command queues can make a determination of the next command that can be executed.

In steps 430 and 440, a retire signal is generated, and the corresponding dependency bits and the validity bits are updated. Once a command has been executed, the inter- and cross-dependencies can change. Also, the order of execution requires updating.

In the strict order queue, the oldest entry pointer 214 of FIG. 2 would have pointed to the executed command. Any commands that depend on the executed command have their corresponding dependency bits reset. Also, the validation bit for the retired entry would be cleared. This process can continue until all queues are empty and have no outstanding commands to be executed.

In the stack down queue, it is not necessarily to oldest entry bit that is executed. Therefore, when a command is executed, the information from the ID bit of the executed command can be utilized to clear corresponding dependencies within the entire multi-queue system. Also, the valid bit of the executed command is cleared so the next command entry can occupy the queue location. This process can continue until all queues are empty and have no outstanding commands to be executed.

It will further be understood from the foregoing description that various modifications and changes can be made in the preferred embodiment of the present invention without departing from its true spirit. This description is intended for purposes of illustration only and should not be construed in a limiting sense. The scope of this invention should be limited only by the language of the following claims.

The invention claimed is:

1. A method for maintaining order between multiple command queues with different ordering requirements, the method comprising:
   receiving a command at a unit pipeline in a multi-queue system, wherein the multi-queue system has a plurality of command queues comprising a strict order queue and a stack down order queue;
   directing the command to a corresponding command queue within the plurality of command queues;
   entering the command into the corresponding command queue as a command entry, wherein the command entry comprises a command portion, a validation bit portion, and a set of dependency bits;
   upon entering the command into the corresponding command queue, taking a snapshot of an opposing command queue within the plurality of command queues; and
   setting the validation bit portion and the set of dependency bits in the command entry based on the snapshot of the opposing command queue.

2. The method of claim 1, wherein the corresponding command queue is the strict order queue.

3. The method of claim 2, the method further comprising:
   entering the command entry into the strict order queue in a location indicated by a newest entry pointer.

4. The method of claim 1, wherein the corresponding command queue is the stack down order queue.

5. The method of claim 1, further comprising:
   determining a next command to execute from the plurality of command queues;
   executing the next command;
   generating a retire signal; and
   updating the validation bit portion and the set of dependency bits of remaining command entries within the plurality of command queues based on the retire signal.

6. The method of claim 5, wherein the retire signal further comprises command identification.

7. The method of claim 6, wherein updating the validation bit portion and the set of dependency bits of a given remaining command entry comprises:
   clearing any dependencies on the executed next command in the set of dependency bits in the given remaining command entry.

8. A multi-queue system, comprising:
   a plurality of command queues comprising a strict order queue and a stack down order queue;
   a unit pipeline for receiving a command;
   means for directing the command to a corresponding command queue within the plurality of command queues;
   means for entering the command into the corresponding command queue as a command entry, wherein the command entry comprises a command portion, a validation bit portion, and a set of dependency bits;
   means for taking a snapshot, upon entering the command into the corresponding command queue, of an opposing command queue within the plurality of command queues; and
   means for setting the validation bit portion and the set of dependency bits in the command entry based on the snapshot of the opposing command queue.

9. The multi-queue system of claim 8, wherein the corresponding command queue is the strict order queue.

10. The multi-queue system of claim 9, further comprising:
    means for entering the command entry into the strict order queue in a location indicated by a newest entry pointer.

11. The multi-queue system of claim 8, wherein the corresponding command queue is the stack down order queue.

12. The multi-queue system of claim 8, further comprising:
    means for determining a next command to execute from the plurality of command queues;
    means for executing the next command;
    means for generating a retire signal; and
    means for updating the validation bit portion and the set of dependency bits of remaining command entries within the plurality of command queues based on the retire signal.

13. The multi-queue system of claim 12, wherein the retire signal further comprises command identification.

14. The multi-queue system of claim 13, wherein the means for updating the validation bit portion and the set of dependency bits of a given remaining command entry comprises means for clearing any dependencies on the executed next command in the set of dependency bits in the given remaining command entry.

* * * * *